United States Patent [19]

Deadmore et al.

[11] 4,374,183
[45] Feb. 15, 1983

[54] SILICON-SLURRY/ALUMINIDE COATING

[75] Inventors: Daniel L. Deadmore, Middleburg Heights; Stanley G. Young, North Olmsted, both of Ohio

[73] Assignee: The United States of America as represented by the Administrator, National Aeronautics and Space Administration, Washington, D.C.

[21] Appl. No.: 293,418

[22] Filed: Aug. 14, 1981

Related U.S. Application Data

[62] Division of Ser. No. 161,254, Jun. 20, 1980, Pat. No. 4,310,574.

[51] Int. Cl.³ .............................................. B32B 15/04
[52] U.S. Cl. ................................. 428/641; 428/650; 428/680; 428/450; 428/469; 427/318; 427/419.2
[58] Field of Search ...................... 428/450, 469, 641; 427/318, 419.2

[56] References Cited

U.S. PATENT DOCUMENTS

| | | | |
|---|---|---|---|
| 3,503,791 | 3/1970 | Armand et al. | 428/450 X |
| 3,869,779 | 11/1975 | Gedwill et al. | 428/678 X |
| 4,326,011 | 4/1982 | Goebel et al. | 428/641 |

FOREIGN PATENT DOCUMENTS

| | | | |
|---|---|---|---|
| 4106531 | 8/1979 | Japan | 428/450 |
| 5083009 | 6/1980 | Japan | 428/450 |

OTHER PUBLICATIONS

Abstract No. 09619C/06, EP#007675, Elbar, Feb. 1980, Forming Silicon Containing Coating on Superalloys.

*Primary Examiner*—P. Ives
*Attorney, Agent, or Firm*—N. Musial; J. Manning; G. Shook

[57] ABSTRACT

A low cost coating protects metallic base system substrates from high temperatures, high gas velocity ovidation, thermal fatigue and hot corrosion. The coating is particularly useful for protecting vanes and blades in aircraft and land based gas turbine engines.

A lacquer slurry comprising cellulose nitrate containing high purity silicon powder is sprayed onto the superalloy substrates. The silicon layer is then aluminized to complete the coating.

The Si-Al coating is less costly to produce than advanced aluminides and protects the substrate from oxidation and thermal fatigue for a much longer period of time than the conventional aluminide coatings. While more expensive Pt-Al coatings and physical vapor desposited MCrAlY coatings may last longer or provide equal protection on certain substrates, the Si-Al coating exceeded the performance of both types of coatings on certain superalloys in high gas velocity oxidation and thermal fatigue. Also, the Si-Al coating increased the resistance of certain superalloys to hot corrosion.

4 Claims, 3 Drawing Figures

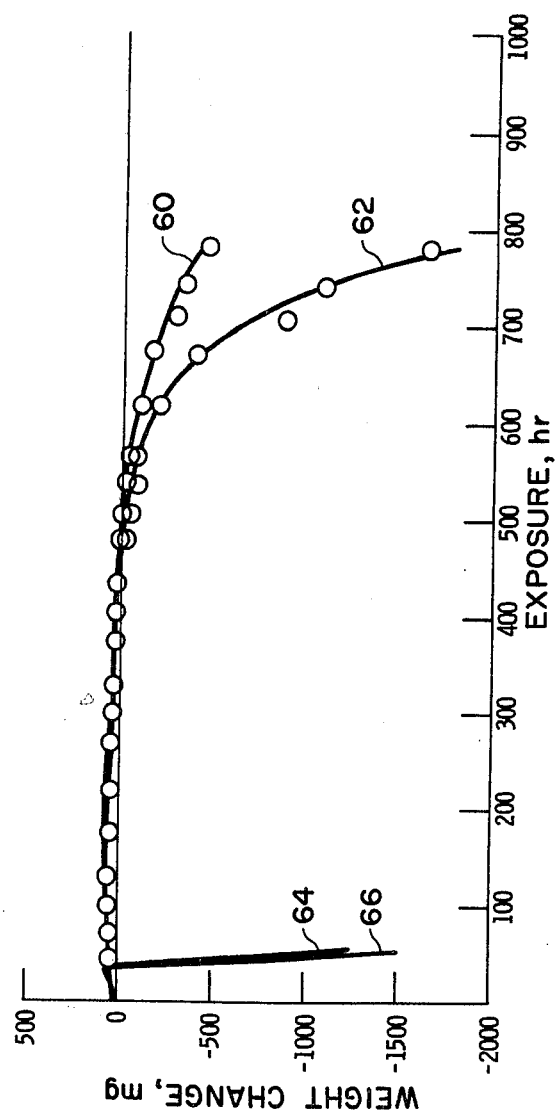

SILICON-SLURRY/ALUMINIDE COATING

DESCRIPTION

ORIGIN OF THE INVENTION

The invention described herein was made by employees of the United States Government and may be manufactured and used by or for the Government for governmental purposes without the payment of any royalties thereon or therefor.

STATEMENT OF COPENDENCY

This application is a division for copending application Ser. No. 161,254 which was filed June 20, 1980 and issued as U.S. Pat. No. 4,310,574.

TECHNICAL FIELD

This invention is directed to the protection of superalloys forming a metallic-base system substrate. The invention is particularly concerned with low cost coatings for protecting turbine blades from high temperatures, high gas velocity oxidation, thermal fatigue, and hot corrosion.

Nickel- and cobalt-base superalloys and dispersion-strengthened alloys are used in vanes and blades in aircraft and land-based gas turbine engines. The efficiency of gas turbine engines increases as the operating temperatures increase. However, these operating temperatures are now restricted by design limitations, by material strength deterioration, and by material capability to resist oxidation and hot corrosion attack. For metal temperatures above 900° C., nickel- and cobalt-base superalloy components usually must be coated to resist such attack.

These superalloys may be protected by conventional aluminide coatings, or by alternate coatings such as claddings, physical vapor deposited MCrAlYs, aluminized NiCrAlSi, and Pt-Al systems. The primary advantage of such systems is that they form an adherent $Al_2O_3$ film which protects the substrate from further oxidation. However, many of these systems not only are expensive to produce, but also lose their protective ability with the passage of time.

BACKGROUND ART

U.S. Pat. No. 3,698,943 to Colantuono discloses a protective coating for high-speed tool steel billets. The coating protects against oxidation and includes sodium borate, silica, and alumina. Weldes et al U.S. Pat. No. 3,372,038 discloses a corrosion-resistant metal coating having aluminum powder dispersed in organic ammonium silicate.

Gedwill et al U.S. Pat. Nos. 3,849,865 and 3,869,779 disclose coatings in which a ductile oxidation resistant metallic alloy is initially applied to a superalloy. An aluminide coating is then applied to the metallic alloy.

Stecura et al U.S. Pat. No. 4,055,705 is directed to a thermal barrier coating system comprising a NiCrAlY bond coating and a reflective oxide thermal barrier coating. The reflective oxide is preferably zirconia that is stabilized with another oxide.

DISCLOSURE OF INVENTION

In accordance with the present invention a low cost coating is formed by applying a slurry spray of high purity silicon to the superalloy substrate. The silicon layer is pack aluminized to complete the coating which is characterized by a sublayer of high purity silicon which combines with aluminum and other elements from particular substrates to create oxides which provide exceptional surface protection.

BRIEF DESCRIPTION OF THE DRAWING

The details of the invention will be described in connection with the accompanying drawings illustrating weight change curves wherein FIG. 3 is a comparison of bare and coated B-1900 alloy substrates after hot corrosion testing.

BEST MODE FOR CARRYING OUT THE INVENTION

Figure 1:
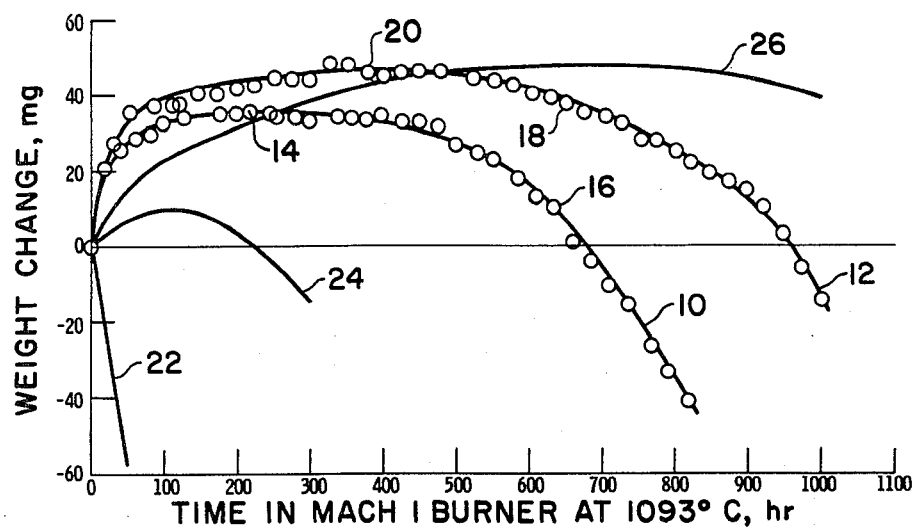
FIG. 1 is a comparison of bare and coated VI-A alloy substrate response to high gas velocity cyclic oxidation.

Various test specimens were prepared in accordance with the present invention to illustrate the beneficial technical effect of the improved coating. The superalloys used for the test specimen substrates are known as NASA VI-A and B-900. It is contemplated that other nickel- and cobalt-base superalloys, as well as composites and directional eutectics, can be used as the metallic base system for the substrate.

The nominal composition of the VI-A superalloy, in weight percent, is 6% chromium, 7-cobalt, 5% aluminum, 2% molybdenum, 1% titanium, 6% tungsten, 9% tantalum, 0.5% hafnium, 0.5% niobium, 0.4% rhenium and the remainder nickel. The nominal composition of the B-1900 superalloy, in weight percent, is 8% chromium, 10% cobalt, 6% aluminum, 6% molybdenum, 1% titanium, 0.1% tungsten, 4% tantalum, 0.1% carbon, 0.1% zirconium, 0.015% boron and the remainder nickel.

The test specimens were initially cleaned in a wet slurry gritblast facility. They were subsequently ultrasonically cleaned in alcohol and then acetone.

A lacquer slurry containing 4 grams of high purity silicon powder per 10 ml vehicle was sprayed by air brushing onto the superalloy specimens to a specific weight of 6 mg $Si/cm^2$. The silicon was 99.9% pure and was of a nominal powder size of −325 mesh. The lacquer was a cellulose nitrate solution that served as both the transport vehicle and binder.

The sprayed specimens were air dryed for 24 hours. After the specimens were dry, they were placed in a pack comprising 98% $Al_2O_3$, 1% NaCl, and 1% Al powder.

The pack was heated to 1100° C. for 16 hours under argon. The weight pickup in the pack averaged 17 mg/cm. The pack was then removed from the furnace and allowed to cool four hours to room temperature before the specimens were removed from the pack.

The specimens were subjected to oxidation and thermal fatigue testing as well as hot corrosion testing. Oxidation and thermal fatigue specimens were run in a natural gas fuel burner rig operating with a gas velocity at the burner nozzle of Mach 1. In each test cycle the specimens were rotated in the air-rich natural gas combustion products for one hour at a metal temperature of 1093° C. and then cooled to near room temperature in three minutes.

Hot corrosion specimens were run in a facility operating on Jet A fuel with a gas velocity of Mach 0.3. Five ppm of synthetic sea salt was added to the combustion gases. The specimens were rotated in the gas flame for one hour at 900° C. and then cooled to near room temperature in three minutes.

Before testing, the specimens were degreased in trichlorethylene vapor and weighed to the nearest 0.1 milligram. At intervals of either 20 or 50 hours of testing, the specimens were removed from the apparatus, reweighed, photographed and inspected for cracks. Each test was run with two specimens coated in accordance with the invention.

After the burner tests were complete, as determined from the appearance of the specimen or weight loss as well as by observation of severe cracking or erosion, the specimens were cut into sections and mounted for metallographic inspection. Some samples of surface oxides were scraped from the edges of the oxidation and thermal fatigue specimens for X-ray diffraction analyses. Microprobe analysis was conducted on the coated VI-A specimens before and after exposure to determine the extent of diffusion of silicon into the alloy and to indicate elements present in the metallic and oxide forms. It appears that silicon in the coating contributed to the formation of silicon-oxide compounds in the protective $Al_2O_3$. The presence of Ta and Mo, also detected in the complex protective oxide scale, indicated that they had diffused from the substrate to the protective scale.

Figure 2:
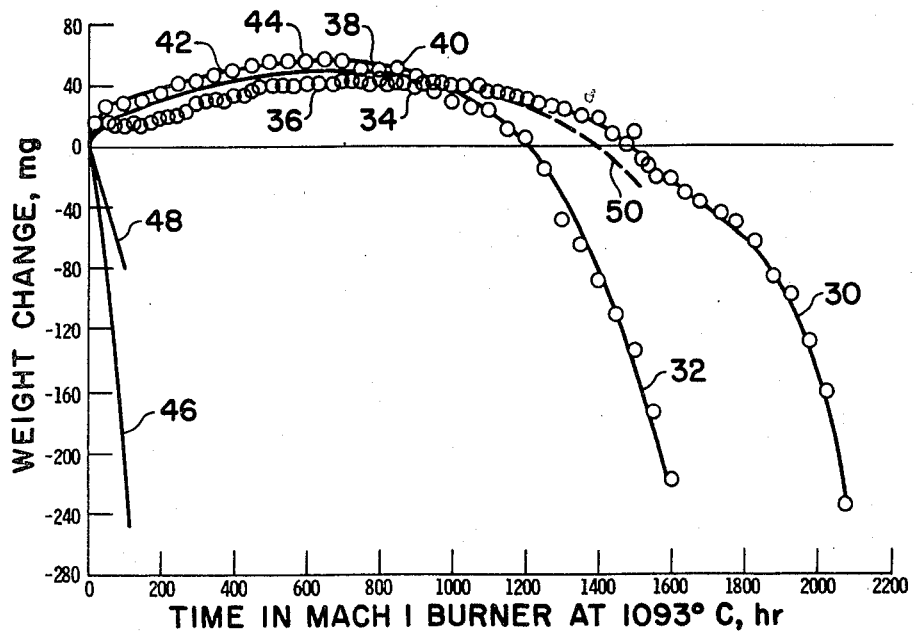
FIG. 2 is a comparison of bare and coated B-1900 alloy substrate response to high gas velocity cyclic oxidation.

The results of the 1093° C. cyclic, Mach 1 burner-rig tests on coated and uncoated alloy specimens are shown in FIGS. 1 and 2. In these figures curves 10, 12, 30 and 32 which are drawn through actual points are for the Si-Al coating data. The other curves are data from tests performed previously in the same burner facilities under the same conditions. They are included for comparison.

Weight change curve 10 in FIG. 1 is drawn through actual test data points obtained for a first specimen of VI-A coated in accordance with the invention. A similar curve 12 is drawn through data points obtained in the test of a second VI-A specimen.

Studies of the failure processes indicated that for oxidation a small pit, fissure, or blister of the coating at either the test specimen leading edge or trailing edge appeared to lead to a thermal fatigue crack, which propagated and provided an expanded area for oxidation. For hot corrosion, the failure process was started by a blister that formed in the coating and allowed very rapid corrosion of the substrate from that site.

A leading edge crack was observed at point 14 on the curve 10 while a trailing edge crack occurred at point 16. Similarly, a leading edge crack appeared at point 18 on the curve 12 while the trailing edge crack appeared at point 20.

A weight change curve for bare VI-A superalloy is shown at 22 while a similar curve 24 is for a VI-A specimen protected by a commercial pack aluminide. The protective ability of a more expensive Pt-Al system on a VI-A specimen is illustrated by the curve 26.

Referring to FIG. 2, a weight change curve 30 is drawn through actual test data points obtained for one specimen of B-1900 superalloy coated in accordance with the present invention. Curve 32 is drawn through data points obtained in the test of another B-1900 specimen.

A leading edge crack was observed at point 34 on the curve 30 while a trailing edge crack occurred at point 36. Two leading edge cracks appeared at points 38 and 40 on curve 32 while trailing edge cracks appeared at points 42 and 44.

A weight change curve for bare B-1900 superalloy is shown at 46 while curve 48 is for an aluminide coated B-1900 secimen. Although there is no test information available regarding the protective ability of Pt-Al systems on B-1900 substrates, weight change curve 26 of FIG. 1 is extrapolated past 1000 hrs. by the dotted line 50 in FIG. 2.

In FIG. 1 large spreads are noted between the weight change curves 10 and 12 of supposedly identical specimens. Likewise, in FIG. 2 similar spreads are noted between the curves 30 and 32. Such a scatter is very common, however, in this type of test because of many uncontrollable variables in the coating application process. It is contemplated that automated spray or electrophorectic deposition systems might provide improved reproducibility.

FIG. 1 shows that the Si-Al coated specimens of lines 10 and 12 have lines from 675 to 960 hrs. Such a life is nearly four times that of commercial pack-aluminide specimens identified by curve 24 which were tested under the same conditions. The uncoated specimen of curve 22 shows rapid weight loss. The Pt-Al specimen had an extrapolated life of approximately twice that of the Si-Al coated VI-A specimen. The curve for the specimen is shown in FIG. 1 and 2.

A comparison of curves 24 in FIG. 1 and 48 in FIG. 2 shows that the B-1900 specimen of FIG. 2 had a shorter life with an aluminide coating than the aluminide coated VI-A specimen of FIG. 1. Yet when the Si-Al coating was applied to a B-1900 superalloy, a burner rig life of one of the specimens shown in line 30 of FIG. 2 even surpassed the reported and extrapolated data for the Pt-Al on VI-A systems by 100 hrs. The Si-Al coated B-1900 specimen was actually run to 2100 hrs. in the burner rig before removal. No thermal fatigue cracks were observed until after 800 hrs., and this is 200 hrs. longer than that reported for the Pt-Al specimen.

The results of the hot corrosion tests on bare and Si-Al coated B-1900 superalloy specimens are shown in FIG. 3. Weight change curves 60 and 62 are for two specimens coated in accordance with the invention. Weight change curves 64 and 66 are for two bare B-1900 specimens. FIG. 3 shows that the coating protects the B-1900 in that the weight change did not become negative until after 500 hrs., as compared to less than 50 hrs., for the uncoated specimens.

While the invention has been described and illustrated with reference to certain preferred embodiments thereof, those skilled in the art will appreciate that various modifications, changes, omissions and substitutions may be made without departing from the spirit of the invention. It is intended, therefore, that the invention will be limited only by the scope of the subjoined claims.

We claim:
1. A coated article of manufacture comprising:
a substrate of a nickel-base superalloy,
a layer of silicon having a purity of about 99.9% and a specific weight of 6 mg of silicon per square centimeter of
surface area covering said substrate, and
an aluminide coating covering said silicon layer.
2. An article of manufacture as claimed in claim 1 wherein the substrate is a superalloy comprising, in weight percent, 6% to 8% chromium, 7% to 10% cobalt, 5% to 6% aluminum, 2% to 6% molybdenum, 4% to 9% tantalum, 0.1% to 6% tungsten, about 1% tita- nium, 0 to 0.5% hafnium, 0 to 0.5% niobium, 0 to 0.4% rhenium,, 0 to 0.1% carbon, 0 to 0.1% zirconium, 0 to 0.015% boron, and the remainder nickel.

3. An article of manufacture as claimed in claim 2 wherein the substrate is a superalloy consisting essentialy of, in weight percent, about 6% chromium, about 7% cobalt, about 5% aluminum, about 2% molybdenum, about 1% titanium, about 6% tungsten, about 9% tantalum, about 0.5% hafnium, about 0.5% niobium, about 0.4% rhenium, and the remainder nickel.

4. An article of manufacture as claimed in claim 2 wherein the substrate is a superalloy consisting essentially of, in weight percent, about 8% chromium, about 10% cobalt, about 6% aluminum, about 6% molybdenum, about 1% titanium, about 0.1% tungsten, about 4% tantalum, about 0.1% carbon, about 0.1% zirconium, about 0.015% boron, and the remainder nickel.

* * * * *